(12) United States Patent
Graham et al.

(10) Patent No.: US 11,351,654 B2
(45) Date of Patent: Jun. 7, 2022

(54) ABRASIVE ARTICLES, ASSEMBLIES, AND METHODS WITH GRIPPING MATERIAL

(71) Applicant: 3M INNOVATIVE PROPERTIES COMPANY, St. Paul, MN (US)

(72) Inventors: Paul D. Graham, Woodbury, MN (US); Douglas A. Davis, Cottage Grove, MN (US); Yugeun P. Yang, St. Paul, MN (US); Thomas E. Pahl, Ames, IA (US); James J. Kobe, Newport, MN (US); Christopher J. Lee, Woodbury, MN (US); Thomas B. Galush, Roseville, MN (US); John G. Petersen, Center City, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/518,280

(22) PCT Filed: Nov. 20, 2015

(86) PCT No.: PCT/US2015/061762
§ 371 (c)(1),
(2) Date: Apr. 11, 2017

(87) PCT Pub. No.: WO2016/085791
PCT Pub. Date: Jun. 2, 2016

(65) Prior Publication Data
US 2017/0304996 A1    Oct. 26, 2017

Related U.S. Application Data

(60) Provisional application No. 62/182,792, filed on Jun. 22, 2015, provisional application No. 62/085,162, filed on Nov. 26, 2014.

(51) Int. Cl.
*B24D 11/02* (2006.01)
*B24D 11/00* (2006.01)
*B32B 27/08* (2006.01)

(52) U.S. Cl.
CPC ............ *B24D 11/02* (2013.01); *B24D 11/001* (2013.01); *B32B 27/08* (2013.01)

(58) Field of Classification Search
CPC ........ B24D 11/001; B24D 11/02; B23B 27/08
See application file for complete search history.

(56) References Cited

U.S. PATENT DOCUMENTS 2,871,218 A    1/1959 Schollenberger
3,645,835 A    2/1972 Hodgson
(Continued)

FOREIGN PATENT DOCUMENTS

JP    2010-274338    12/2010
WO    WO 95/19242    7/1995
(Continued)

OTHER PUBLICATIONS

Plasco Corp. "Comparison between Shore and Rockwell Hardness Ranges" (May 8, 2002).*
(Continued)

*Primary Examiner* — Pegah Parvini
*Assistant Examiner* — Ross J Christie

(57) ABSTRACT

An abrasive article is provided that has a backing having opposed first and second major surfaces, an abrasive layer disposed on the first major surface, and a plurality of protrusions extending outwardly from the second major surface. The protrusions comprise a polymer having a Shore A hardness ranging from 5 to 90. These articles provide an alternative sanding solution enabling abrasive articles lacking an attachment layer to be handled effectively and efficiently, providing for a technically superior abrasive sheet
(Continued)

on the marketplace that does not use or require an attachment layer.

18 Claims, 5 Drawing Sheets

(56) References Cited

U.S. PATENT DOCUMENTS

| | | | |
|---|---|---|---|
| 4,595,001 A | 6/1986 | Potter | |
| RE33,353 E | 9/1990 | Heinecke | |
| 5,088,483 A | 2/1992 | Heinecke | |
| 5,109,638 A | 5/1992 | Kime, Jr. | |
| 5,490,808 A | 2/1996 | Jantschek | |
| 5,573,816 A | 11/1996 | Gaeta | |
| 5,578,095 A | 11/1996 | Bland | |
| 6,299,508 B1 * | 10/2001 | Gagliardi | B24D 3/34 |
| | | | 451/28 |
| 6,352,471 B1 * | 3/2002 | Bange | A46B 3/005 |
| | | | 451/527 |
| 6,372,323 B1 | 4/2002 | Kobe | |
| 6,432,549 B1 | 8/2002 | Kronzer | |
| 6,544,306 B2 * | 4/2003 | Suzuki | B24D 3/001 |
| | | | 51/295 |
| 6,579,161 B1 | 6/2003 | Chesley et al. | |
| 6,838,589 B2 | 1/2005 | Liedtke | |
| 6,884,504 B2 | 4/2005 | Liu | |
| 8,308,532 B2 | 11/2012 | Usui et al. | |
| 8,348,723 B2 | 1/2013 | Woo et al. | |
| 2004/0020133 A1 | 2/2004 | Paxton | |
| 2004/0063390 A1 * | 4/2004 | Codd | B24D 15/045 |
| | | | 451/523 |
| 2007/0066186 A1 | 3/2007 | Annen et al. | |
| 2007/0243802 A1 | 10/2007 | Petersen | |
| 2009/0035519 A1 * | 2/2009 | Gaeta | B24D 3/004 |
| | | | 51/298 |
| 2009/0191800 A1 * | 7/2009 | Rivard | B24D 9/003 |
| | | | 451/466 |
| 2012/0000135 A1 | 1/2012 | Eilers | |
| 2012/0231707 A1 | 9/2012 | Pahl | |
| 2012/0231708 A1 | 9/2012 | Pahl | |
| 2013/0059506 A1 | 3/2013 | Qian et al. | |

FOREIGN PATENT DOCUMENTS

| | | | |
|---|---|---|---|
| WO | WO 2000/020210 | 4/2000 | |
| WO | WO-0133989 A1 * | 5/2001 | B24D 9/085 |
| WO | WO-2005102607 A1 * | 11/2005 | B24D 9/085 |
| WO | WO-2007119886 A1 * | 10/2007 | B24B 27/033 |
| WO | WO 2012/102978 | 8/2012 | |
| WO | WO 2015/0167910 | 11/2015 | |
| WO | WO 2016/073227 | 5/2016 | |

OTHER PUBLICATIONS

"Handbook of Pressure Sensitive Adhesive Technology," 2nd ed. (1989), pp. 172-176.

* cited by examiner

ABRASIVE ARTICLES, ASSEMBLIES, AND METHODS WITH GRIPPING MATERIAL

CROSS REFERENCE TO RELATED APPLICATIONS

This application is a national stage filing under 35 U.S.C. 371 of PCT/US2015/061762, filed 20 Nov. 2015, which claims the benefit of U.S. Provisional Patent Application No. 62/085,162, filed 26 Nov. 2014 and U.S. Provisional Patent Application No. 62/182,792, filed 22 Jun. 2015, the disclosures of which are incorporated by reference in their entirety herein.

FIELD OF THE INVENTION

Provided herein are abrasive articles, assemblies, and methods for abrading a workpiece. Said abrasive articles, assemblies, and methods can be implemented either by hand or with the assistance of a power tool.

BACKGROUND

Many abrasive sheets sold in the marketplace have an attachment surface on their non-abrasive surface to facilitate their attachment to various sanding accessories. These accessories are needed to improve the ability of the end-user to efficiently move the abrasive along the surface of the workpiece. As an example, many abrasives contain a woven fabric that provides a set of loops that bond to a set of hooks on a foam sanding accessory.

SUMMARY

While the attachment layers can serve a useful purpose, they also add cost and may compromise the abrasive performance. In the case of abrasives that aim to be as flexible and conformable as possible, the attachment layer can add stiffness and reduce conformability. For certain applications, the operator may elect to forego using an attachment layer, even though this may complicate the handling of the abrasive. This, however, tends to induce inefficiencies associated with slippage, poor ergonomics, and risks of abrasion to the hands of the operator.

There is a present need for an alternative sanding solution enabling abrasive articles lacking an attachment layer to be handled effectively and efficiently, providing for a technically superior abrasive sheet on the marketplace that does not use or require an attachment layer.

Specifically, this new sanding method involves the following steps: 1) providing an abrasive sheet having a front surface consisting of an abrasive coating and a back surface, 2) providing a sanding accessory in which one side is at least partially covered with a high-friction polymeric resin that is formed into a three-dimensional ("3D") dimensional structure, 3) contacting the sanding accessory with at least a portion of the back surface, 4) contacting the abrasive surface of the abrasive sheet with a work piece and using the sanding pad to slide the abrasive over the surface of the work piece.

In some embodiments, the sanding accessory may consist of a foam block with one or more surfaces covered with a gripping material.

In some embodiments, a rubber layer may be incorporated between the foam and the gripping material on one or more surfaces of the sanding accessory. This rubber layer, for example, may consist of a 1.6 millimeter thick layer of styrene-butadiene-rubber with a durometer of 75.

The abrasives used in the provided methods can be made from a variety of backing materials, including polymer films, paper, woven and non-woven materials. The inventive method can be particularly advantageous when used in combination with abrasives that are based on polyurethane backings.

In one aspect, an abrasive article is provided. The abrasive article comprises: a backing having opposed first and second major surfaces; an abrasive layer disposed on the first major surface; and a plurality of protrusions extending outwardly from the second major surface, wherein the protrusions comprise a polymer having a Shore A hardness ranging from 5 to 90.

In another aspect, a method of using an abrasive assembly is provided, the method comprising the steps of: providing a substrate that comprises a base layer and a plurality of protrusions extending outwardly from the base layer, the protrusions comprise a polymer having a Shore A hardness ranging from 5 to 90; frictionally engaging the plurality of protrusions with a back surface of an abrasive article while using a working surface of the abrasive article to abrade the workpiece; disengaging the substrate from the abrasive article; and rubbing the plurality of protrusions against the working surface of the abrasive article to dislodge swarf or debris.

In yet another aspect, an abrasive article is provided comprising: an abrasive backing having opposed first and second major surfaces; an abrasive layer disposed on the first major surface; and a gripping layer releasably attached to the second major surface, wherein the gripping layer has a plurality of outwardly extending protrusions and wherein the protrusions comprise a polymer having a Shore A hardness ranging from 5 to 90.

DEFINITIONS

Figure 1:
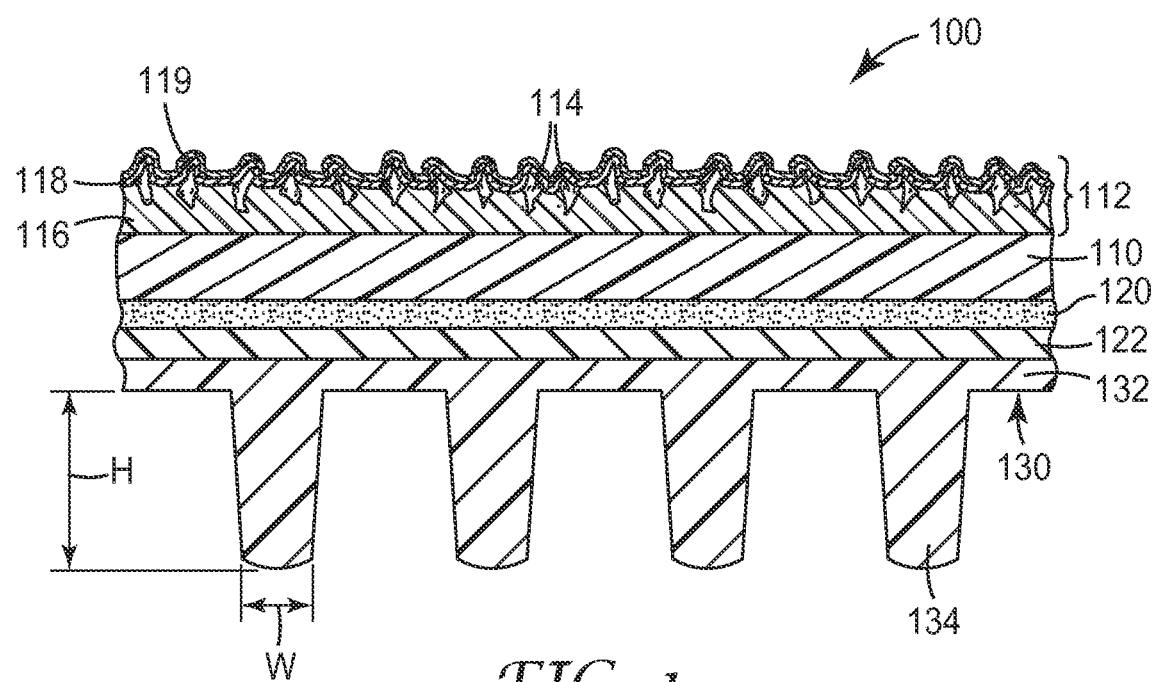
FIGS. 1-7 are side cross-sectional views of abrasive articles and related accessories according to various exemplary embodiments.

As used herein:

"ambient conditions" means at approximately 25 degrees Centigrade and 101 kilopascals (or 1 atmosphere) pressure;

"conformable" means capable of adjusting shape in response to an applied mechanical force;

"particle size" refers to the longest dimension of the particle;

"layer" refers to either a discontinuous or continuous coating of material extending across all or a portion of a different material; and "resilient" means capable of returning to an original shape or position, as after being stretched or compressed.

Detailed Description

The following sections describe through illustration and example particular embodiments of the provided abrasive articles. Repeated use of reference characters in the specification and drawings generally represents the same or analogous features or elements within the disclosure. It should be understood that numerous other modifications and embodiments can be devised by those skilled in the art, which fall within the scope and spirit of the principles of the disclosure. The figures may not be drawn to scale.

An exemplary abrasive article is illustrated according to one embodiment in FIG. 1 and herein referred to by the numeral 100. As depicted here, the abrasive article 100 is a multilayered article. The multilayered article includes a coated abrasive layer 112, a base layer 110, an adhesive layer 120, a reinforcing layer 122, and a gripping layer 130.

The uppermost layer of the abrasive article 100 in FIG. 1 is the abrasive layer 112, which itself is comprised of several constituent layers. Optionally and as shown, the abrasive layer 112 is a coated abrasive film. The coated abrasive film generally includes a plurality of abrasive particles 114 secured to a plurality of hardened resin layers. In some embodiments, the abrasive particles 114 are adhesively coupled to the base layer 110 by implementing a sequence of coating operations involving a hardenable make layer 116 and size layer 118, and a supersize layer 119, as described for example in U.S. Patent Publication No. 2012/0000135 (Eilers et al.). When thus secured, the abrasive particles 114 are partially or fully embedded in respective layers 116, 118, 119, yet located at or sufficiently close to the surface of the abrasive article 100 whereby the abrasive particles 114 come into frictional contact with the substrate when the abrasive article 100 is rubbed against the substrate.

While not shown here, the abrasive layer 112 may instead comprise an abrasive composite where abrasive particles are uniformly mixed with a binder to form a viscous slurry. This slurry can then be cast and appropriately hardened (for example, using a thermal or radiation curing process) onto the base layer 110 to obtain the abrasive layer 112.

As a further option, the abrasive slurry could be molded onto the base layer 110 to form a structured abrasive. Structured abrasives can be made by mixing abrasive particles and a hardenable precursor resin in a suitable binder resin (or binder precursor) to form a slurry, casting the slurry between the underlying film and a mold having tiny geometric cavities, and then hardening the binder. After hardening, the resulting abrasive coating is formed into a plurality of tiny, precisely shaped abrasive composite structures affixed to the underlying film. The hardening of the binder can be achieved by exposure to an energy source. Such energy sources can include, for example, thermal energy and radiant energy derived from an electron beam, ultraviolet light, or visible light.

The abrasive particles 114 are not limited and may be composed of any of a wide variety of hard minerals known in the art. Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and combinations thereof. The alumina abrasive particles may contain a metal oxide modifier. The diamond and cubic boron nitride abrasive particles may be monocrystalline or polycrystalline.

In nearly all cases, there is a range or distribution of abrasive particle sizes. The number average particle size of the abrasive particles may range from between 0.001 and 300 micrometers, between 0.01 and 250 micrometers, or between 0.02 and 100 micrometers.

Adjacent to the abrasive layer 112 is the base layer 110. The base layer 110 is preferably made from a polymeric film that preserves or enhances the flexibility and resiliency of the abrasive article 100.

In preferred embodiments, the base layer 110 comprises an elastomeric film. The elastomeric film may be monolithic or may itself be a composite film having multiple layers produced by coextrusion, heat lamination, or adhesive bonding. Examples of materials that may be used in the elastomeric film include polyolefin, polyester (e.g., those available under the trade designation "HYTREL" from E.I. du Pont de Nemours & Co., Wilmington, Del.), polyamide, styrene/butadiene copolymer (e.g., those available under the trade designation "KRATON" from Kraton Polymers, Houston, Tex.), and polyurethane elastomers (e.g., polyurethane elastomers available under the trade designation "ESTANE 5701" and "ESTANE 5702"); chloroprene rubber, ethylene/propylene rubbers, polybutadiene rubber, polyisoprene rubber, natural or synthetic rubber, butyl rubber, silicone rubber, or EPDM rubber; and combinations thereof. Further examples of useful elastomeric films include those described in U.S. Pat. No. 2,871,218 (Schollenberger); U.S. Pat. No. 3,645,835 (Hodgson); U.S. Pat. No. 4,595,001 (Potter et al.); U.S. Pat. No. 5,088,483 (Heinecke); U.S. Pat. No. 6,838,589 (Liedtke et al.); and RE33353 (Heinecke). Still other useful elastomeric films include pressure sensitive adhesive coated polyurethane elastomer films, commercially available from 3M Company, St. Paul, Minn., under the trade designation "TEGADERM."

The base layer 110 optionally has a smooth major surface that faces away from the abrasive layer 112.

Alternatively, the base layer 110 may be made from a polymer derived from: 0-50 wt % carboxylic acid resins (for example, acrylate acid); 0-50 wt % of alkyl acrylates, alkyl methacrylates, and alkyl ethacrylates (for example, ethyl acrylate); 0-50 wt % unsaturated acetate (for example, vinyl acetate); and $\alpha$-olefins (for example, ethylene) making up the balance. These resins may be completely or partially neutralized by metal hydroxides or other suitable basic materials.

In exemplary embodiments, the base layer 110 has a percent elongation at break of at least 100 percent, at least 200 percent, at least 300 percent, at least 400 percent, or at least 500 percent, as measured under ambient conditions. Optionally, the base layer 110 has a percent elongation at break of at most 1000 percent, at most 800 percent, at most 700 percent, at most 600 percent, or at most 500 percent, as measured under ambient conditions.

Preferred materials for the base layer 110 are non-tacky under ambient conditions. For the purposes of this disclosure, the term "non-tacky" refers to a material that satisfies the Dahlquist criterion for a non-tacky substance, implying it has a storage modulus (G') of greater than about $3 \times 10^5$ pascals (measured at 10 radians/second at ambient temperature), as described in U.S. Pat. No. 6,884,504 (Liu et al.) and "Handbook of Pressure Sensitive Adhesive Technology," $2^{nd}$ ed. (1989), pp. 172-176 (substances having a storage modulus less than or equal to this threshold would be considered to display tack as defined by the Dahlquist criterion).

Referring again to FIG. 1, the article 100 further comprises an adhesive layer 120. The adhesive layer 120 extends along the bottom of the base layer 110 and couples the base layer 110 and the reinforcing layer 122 to each other. In a preferred embodiment, the adhesive layer 120 includes a pressure sensitive adhesive. For example, the adhesive layer 120 could be a double-sided adhesive tape.

The reinforcing layer 122 extends across and contacts the bottom surface of the adhesive layer 120. The reinforcing layer 122 is an optional layer that serves strengthen the abrasive article 100. Although depicted here as a discrete layer, the reinforcing layer may also be made integral with the underlying gripping layer 130.

The composition of the reinforcing layer 122 is also not particularly restricted so long as it has sufficient flexibility and conformability to allow sufficient contact between the adhesive layer 120 and the gripping layer 130 to intimately couple these layers to each other and avoid delamination. The reinforcing layer 122 may be directly laminated to the gripping layer 130, as shown in FIG. 1, or adhesively bonded to the gripping layer 130 using a second adhesive layer. The reinforcing layer 122 can be made from a polymeric film, primed polymeric film, metal foil, cloth, paper, vulcanized fiber, nonwovens, treated versions thereof, and combinations thereof.

The gripping layer 130 is the bottom layer of the abrasive article 100 in FIG. 1. Exemplary materials that could be used in the gripping layer 130 are generally described in U.S. Pat. No. 6,372,323 (Kobe et al.). Optionally and as shown, the gripping layer 130 includes a protrusion backing 132 and a plurality of protrusions 134 that extend outwardly from the protrusion backing 132. In alternative embodiments, the protrusion backing 132 may be omitted such that the protrusions 134 are disconnected from each other and individually coupled directly to the reinforcing layer 122.

The protrusions 134 may be arranged according to either a regular or irregular two-dimensional replicated pattern or array. Preferably, the external, exposed surfaces of the protrusions 134 and/or the protrusion backing 132 are made from an elastomeric material.

In the embodiments shown, the protrusions 134 are generally cylindrical in shape. Since these protrusions 134 can be made using a molding process, the sides of the protrusions 134 typically have a slight taper to facilitate removal from the mold. It is understood, however, that the protrusions 134 can assume any of a number of non-cylindrical shapes, including truncated cones or pyramids, rectangles, hemispheres, squares, hexagons, octagons, and combinations thereof.

The protrusions 134 preferably have a configuration that facilitates some degree of deflection, or buckling, when compressive force is applied to the gripping layer 130. Optionally and as shown, the protrusions 134 have a certain height "H" and a certain width "W" (both shown in FIG. 1), where each is fairly uniform (or monodisperse) about an average respective value. Having a distribution of heights and widths, however, could also provide an acceptable gripping surface.

The absolute height of the protrusions 134 need not be particularly restricted, but exemplary embodiments of the abrasive article 100 use protrusions 134 having an average height "H" of at least 10 micrometers, at least 25 micrometers, at least 50 micrometers, at least 75 micrometers, or at least 100 micrometers, where the average height "H" is at most 800 micrometers, at most 700 micrometers, at most 600 micrometers, at most 500 micrometers, or at most 400 micrometers.

The number average height-to-width aspect ratio ("H/W") of the protrusions 134 can be at least 0.5, at least 0.75, at least 1, at least 1.1, or at least 1.25. On the upper end, the number average height-to-width aspect ratio of the protrusions 134 may extend up to 10, up to 9, up to 8, up to 7, up to 6, or up to 5.

The number density of the protrusions 134 will depend in part on their size, and could also vary based on the desired texture of the gripping layer 130. In some embodiments, the protrusions 134 have an areal number density of at least 15 per square centimeter, at least 50 per square centimeter, at least 100 per square centimeter, at least 150 per square centimeter, or at least 250 per square centimeter. In some embodiments, the protrusions 134 have an areal number density of at most 1500 per square centimeter, at most 1250 per square centimeter, at most 1000 per square centimeter, at most 800 per square centimeter, or at most 600 per square centimeter.

Preferably, the protrusions 134 are free of any undercuts and thus do not significantly mechanically interlock with mating surfaces of the backup pad, or any other device used to grip the abrasive article 100. More generally, the protrusions 134 preferably do not use a fastener, clip, latch, bale, adhesive, or any other mechanical or chemical means for coupling the abrasive article 100 to a mating device besides the frictional engagement described above.

As mentioned, some or all of the gripping layer 130 is preferably made from an elastomeric material. Here, the term "elastomer" or "elastomeric" refers to rubbers or polymers that have resiliency properties similar to those of rubber. In particular, the term elastomer reflects the property of the material that it can undergo a substantial elongation and then return to its original dimensions upon release of the stress elongating the elastomer. In all cases an elastomer must be able to undergo at least 10% elongation (at a thickness of 0.5 mm), and more preferably at least 30% elongation, and return to at least 50% recovery after being held at that elongation for 2 seconds and after being allowed 1 minute relaxation time. More typically, an elastomer can undergo 25% elongation without exceeding its elastic limit. In some cases elastomers can undergo elongation to as much as 300% or more of their original dimensions without tearing or exceeding the elastic limit of the composition. Elastomers are typically defined to reflect this elasticity as in ASTM Designation D883-96 as a macromolecular material that at room temperature returns rapidly to approximately its initial dimensions and shape after substantial deformation by a weak stress and release of the stress. ASTM Designation D412-98A can be an appropriate procedure for testing rubber properties in tension to evaluate elastomeric properties.

For some applications, thermoset elastomers may be used. Generally, such compositions include relatively high molecular weight compounds which, upon curing, form an integrated network or structure. The curing may be by a variety of methods, including chemical curing: agents, catalysts, and/or irradiation.

The final physical properties of the material are a function of a variety of factors, including the number and weight average polymer molecular weights, the melting or softening point of the reinforcing domains of the elastomer, if any (which, for example, can be determined according to ASTM Designation D1238-86), the percent by weight of the elastomer composition which comprises hard segment domains, the structure of the toughening or soft segment (low $T_g$) portion of the elastomer composition; the crosslink density, and the nature and levels of additives or adjuvants.

Exemplary classes of elastomers include anionic triblock copolymers, polyolefin-based thermoplastic elastomers, thermoplastic elastomers based on halogen-containing polyolefins, thermoplastic elastomers based on dynamically vulcanized elastomer-thermoplastic blends, thermoplastic polyether ester or polyester based elastomers, thermoplastic elastomers based on polyamides or polyimides, ionomeric thermoplastic elastomers, hydrogenated block copolymers in thermoplastic elastomer interpenetrating polymer networks, thermoplastic elastomers by carbocationic polymerization, polymer blends containing styrene/hydrogenated butadiene block copolymers, and polyacrylate-based thermoplastic elastomers. Some specific examples of elastomers are natural rubber, butyl rubber, EPDM rubber, silicone rubber such as polydimethyl siloxane, polyisoprene, polybutadiene, polyurethane, ethylene/propylene/diene terpolymer elastomers, chloroprene rubber, styrene-butadiene copolymers (random or block), styrene-isoprene copolymers (random or block), styrene-ethylene-butylene copolymers (random or block), acrylonitrile-butadiene copolymers, mixtures thereof and copolymers thereof. The block copolymers may be linear, radial or star configurations and may be diblock (AB) or triblock (ABA) copolymers mixtures thereof. Blends of these elastomers with each other or with modifying non-elastomers are also contemplated. Particularly preferred polymers include polyurethanes, styrene-ethylene-butylene-styrene block copolymers, styrene-isoprene-styrene block copolymers, and blends thereof. Commercially available elastomers include block polymers (e.g., polystyrene materials with elastomeric segments), available from Shell Chemical Company of Houston, Tex., under the designation KRATON™.

The hardness of the polymer used in the protrusions 134 can be characterized by its Shore durometer. For the purpose of this disclosure, Shore durometer is based on the ASTM D2240 type A measurement system. In some embodiments, the polymer has a Shore A hardness of at least 5, at least 7, at least 10, at least 15, or at least 20. In some embodiments, the polymer has a Shore A hardness of at most 90, at most 85, at most 80, at most 75, or at most 70.

If desired, the aforementioned abrasive articles may undergo post processing prior to being packaged and sold. For example, the abrasive article 100 can be mechanically flexed using a continuous roll-to-roll process following the fabrication of the abrasive article. Typically this is accomplished by guiding the web around cylindrical bars of suitably small diameter to remove curvature. This has the benefit of reducing the extent of curl induced by the fabrication process and can also improve the overall flexibility of the abrasive article 100.

Advantageously, the abrasive article 100 has a high friction surface that prevents slippage when engaged to a hand or gloved hand, rendering a sanding accessory unnecessary under circumstances where they were previously needed. This can enable the operator to have an improved tactile feel when sanding a workpiece. Where the operator decides to use a sanding accessory, the high friction surface is still beneficial because it prevents relative movement between the abrasive article 100 and accessory. By using simply frictional contact, this solution is also easier to use than conventional fastening mechanisms such as adhesives, latches, clips, and hook-and-loop attachment layers, each of which require significant operator intervention in both placing and removing the abrasive article.

Additional options and advantages with respect to constituent layers of the abrasive article 100 may be found in U.S. Provisional Application Ser. No. 62/076,874 (Graham et al.), filed on Nov. 7, 2014.

The gripping layer 130 can be disposed in other advantageous configurations, depending on the particular application and user preferences. Some of these alternative embodiments are shown, for example, in FIGS. 2-5.

Figure 2:
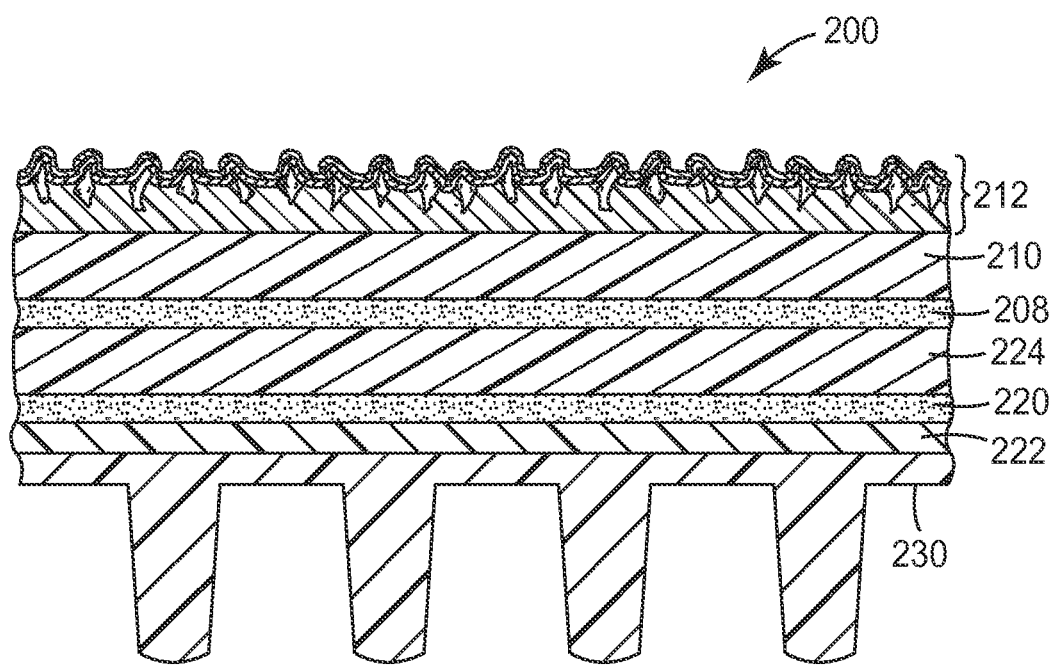

FIG. 2 shows an alternative abrasive article 200 having embedded flexographic images. The abrasive article 200 has an abrasive layer 212, base layer 210, adhesive layer 220, reinforcing layer 222, and gripping layer 230, each of which serves a function essentially analogous to that of the corresponding structure in abrasive article 100. The abrasive article 200 additionally includes, however, an ink layer 208 and a second base layer 224. As described in U.S. Provisional Application Ser. No. 62/076,874, embedding the ink layer 208 between the base layers 210, 224 provides for enhanced overall robustness of the abrasive article 200 and further enables efficient flexographic printing of these articles in a continuous process while avoiding damage to web handling equipment by the coated abrasive. Other structural and functional aspects of the abrasive article 200 are similar to those of abrasive article 100 and shall not be repeated.

Figure 3:
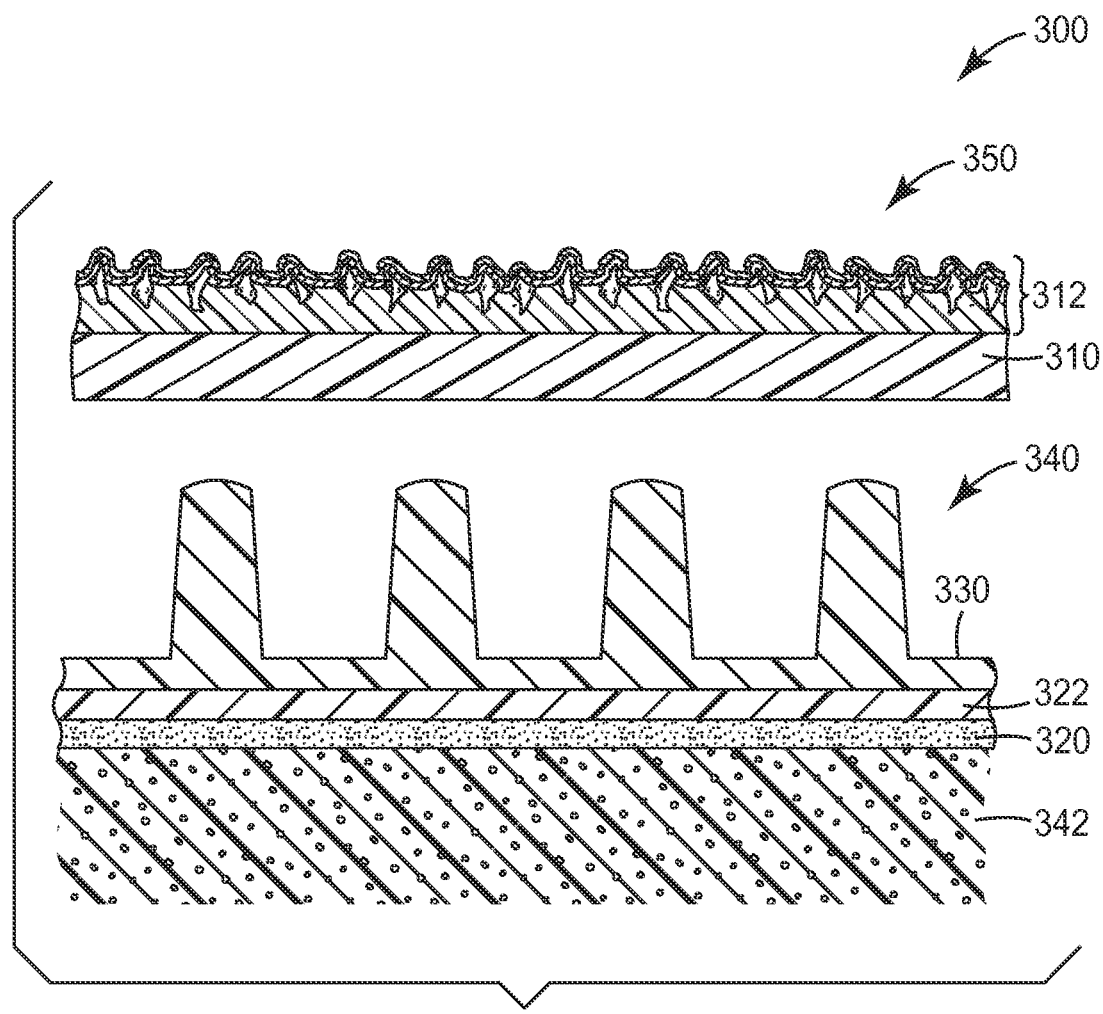

FIG. 3 shows an abrasive assembly 350 in which the gripping layer is disposed on an accessory device instead of the abrasive article. The abrasive assembly 350 includes an abrasive article 300 and a substrate 340. The abrasive article 300, as shown here in simplified form, includes an abrasive layer 312 and underlying base layer 310. The substrate 340 includes a body 342. Optionally, the body 342 is resiliently compressible, and may be made from a soft engineering foam or sanding block. With the understanding that the view of the body 342 shown in FIG. 3 is fragmentary and not necessarily to scale, the body 342 could be part of a much larger structure, such as a power sanding tool, glove, a component thereof, or any other structure used to drive movement of the abrasive article 300 against a workpiece in an abrading operation.

Remaining components of the substrate 340 include an adhesive layer 320, reinforcing layer 322, and gripping layer 330. These components collectively provide the substrate 340 with a working surface having enhanced friction as previously described. When the working surface of the substrate 340 is engaged with the back surface of the abrasive article 300 (represented in FIG. 3 as the exposed bottom surface of the base layer 310), the abrasive assembly 350 can be moved as a unit during an abrading operation without need for an adhesive or mechanical fastener.

As an additional benefit to placing the gripping layer 330 on the substrate 340, the substrate 340 is not abrasive specific. That is, it can be used to drive any of a wide variety of generic abrasive articles, including those not originally intended to be used with the gripping layer 330 as described here.

Figure 4:
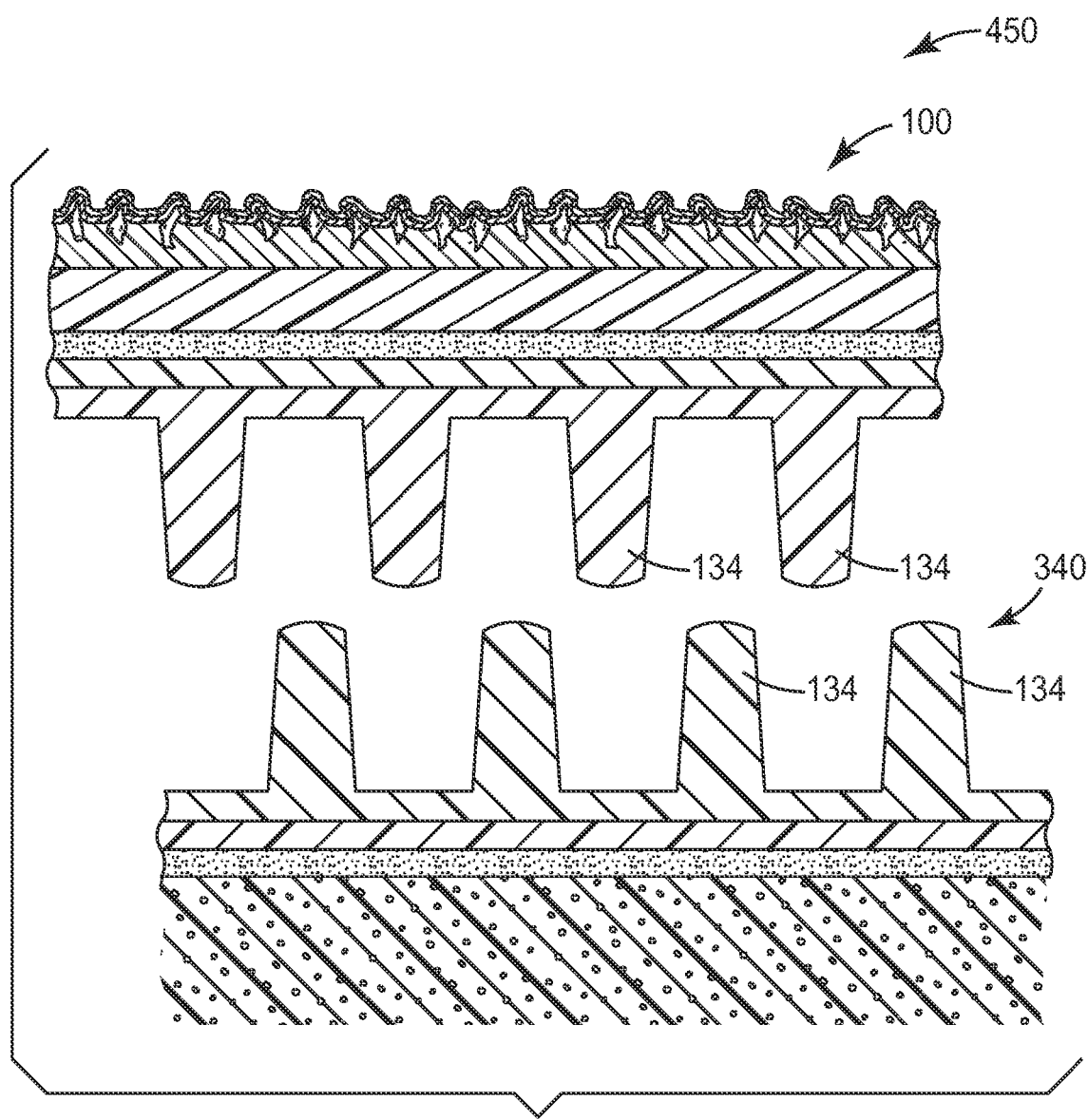

Combinations of the above articles and accessories are also possible, as shown by FIG. 4. FIG. 4 shows an abrasive assembly 450 obtained by mating the abrasive article 100, as previously shown and described, and the substrate 340, as previously shown and described. This configuration demonstrates an added benefit of having a gripping layer on both mating surfaces. As shown, the frictional engagement between these surfaces is further enhanced by virtue of having the protrusions 134 meshing with the protrusions 334 in complementary fashion. Because the protrusions interdigitate, very high levels of shear force are required to cause slippage.

Figure 5:
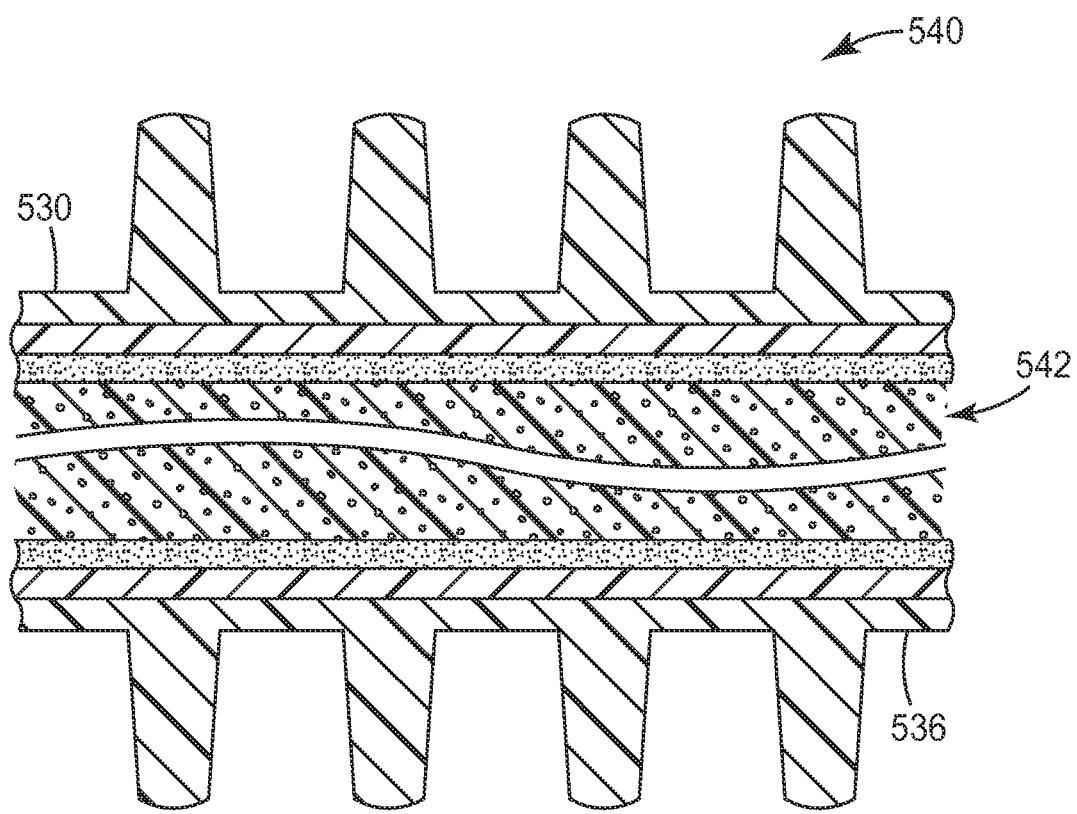

FIG. 5 shows an abrasive substrate 540 that is essentially a variant of the substrate 340, which has a pair of gripping layers 530, 536 disposed onto opposing major surfaces of a body 542. Advantageously, the substrate 540 provides a convenient solution that not only secures the substrate 540 to a generic abrasive article (not shown) but also secures the substrate 540 to the hand of an operator. In alternative embodiments, the substrate 540 is part of a backup pad that is in turn secured to a power tool, such as a dual action sander.

Figure 6:
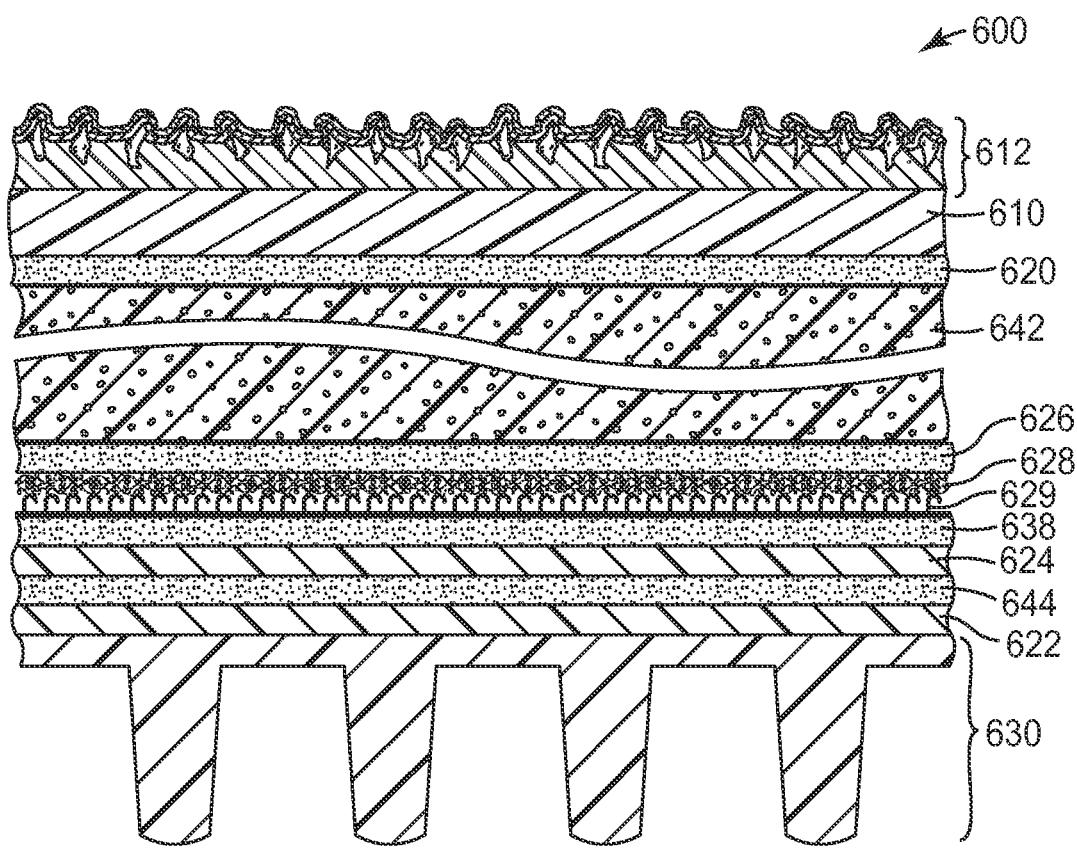

Another exemplary multilayered abrasive article 600 is illustrated in FIG. 6. The abrasive article 600 includes, in the following order: an abrasive layer 612, an optional first base layer 610, an optional first adhesive layer 620, an optional foamed body 642, an optional second adhesive layer 626, a loop layer 628, a hook layer 629 (having a configuration to releasably engage and attach to the loop layer 628), a third adhesive layer 638, an optional second base layer 624, an optional fourth adhesive layer 644, an optional reinforcing layer 622 and a gripping layer 630.

The abrasive layer 612 may be made from any type of abrasive and it may comprise multiple layers and/or involve multiple coating steps. For example, the abrasive layer 612 may comprise a make coating, a mineral coating, a size coating and/or a supersize coating, as previously described. The abrasive layer 612 may alternatively use a three-dimensional abrasive such as a TRIZACT brand abrasive available from 3M Company, St. Paul, Minn. Also, the abrasive coating may be made by coating an abrasive slurry by any of a number of known methods, including spray coating.

The first base layer 610 is not particularly restricted and could be constructed of, for example, a polymeric film, paper, or fabric material.

The first adhesive layer 620 may include any known adhesive, such as pressure-sensitive adhesive, capable of permanently bonding its neighboring layers (here, the first base layer 610 and the foamed body 642) to each other. The same is applicable to each of the other adhesive layers 626, 638, 644 in FIG. 6.

The foamed body 642, in a preferred embodiment, is made from a resilient and compressible foam. The foam material may include any of a number of different foams known in the art, such as open-celled polyurethane foams. Optionally, the foamed body 642 could be substituted with a non-foamed (e.g., solid) polymer layer.

The loop layer 628, representing one-half of a hook-and-loop attachment system, can be made from a woven fabric comprised of polyethylene terephthalate ("PET") or nylon fibers. This fabric may be described as "brushed" or "napped" in reference to the process that produces the loops.

The complemental hook layer 629 can be any material capable of releasable attachment to the loop layer 628. The hook layer 629 is comprised of a polypropylene material having resilient hooks, but could also use an equivalent structure, such as an array of posts having "mushroom" style caps on their distal ends.

The second base layer 624 provides added strength to the abrasive article 600 and may be comprised of any of a variety of tough, flexible polymeric materials, such as polyurethane.

The reinforcing layer 622 serves to strengthen the adjacent gripping layer 630 and can be made of any suitable material. In some embodiments, the reinforcing layer 622 is made from a woven fabric material made from PET or nylon fibers.

The underlying gripping layer 630 can include any of the materials previously described with respect to the gripping layer 130 of abrasive article 100.

In this construction, the hook and loop layers 628, 629 are capable of repeated engagement to and disengagement from each other without significant damage. In this way, layers 629, 638, 624, 644, 622 and 630 represent an accessory that can be collectively separated from the remaining layers in the abrasive article 600. With these layers separated, the resulting article is capable of attachment to a standard power tool via the loop layer 628. At any point, these layers can be re-attached and the underlying gripping layer provides a convenient surface to facilitate hand sanding.

Figure 7:
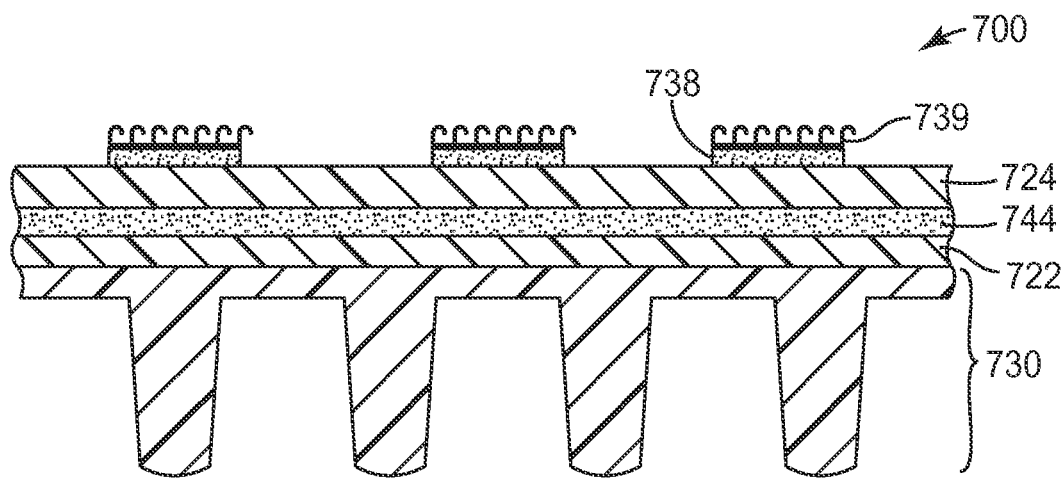

An alternative accessory 700 is shown in FIG. 7. This accessory 700 features a hook layer 739, adhesive layer 738, optional base layer 724, optional adhesive layer 744, second base layer 722, and gripping layer 730, and may be attached to any abrasive with a loop attachment layer in order to improve the performance of said abrasive in a hand sanding context.

A notable feature shown in FIG. 7 is that the hook layer 739 and associated adhesive layer 738 is disposed on the base layer 724 in a discontinuous manner. For example, as shown, these layers comprise a regular or irregular array of discrete islands. This allows the attachment force between the accessory and the abrasive to be controlled by modifying the size and packing density of the discrete islands. Also, in some applications this has the desirable impact of maintaining the overall flexibility of the hook layer. In many cases, the hook layer is a stiff polypropylene layer, and divided into discontinuous segments prevents it from imparting undue stiffness to the accessory.

As an unexpected benefit, it was discovered that the same friction-enhancing texture used for increase friction between the substrate and the abrasive article can also be used to remove from the working surface of the abrasive article swarf and/or debris buildup after an abrading operation.

In an exemplary method of using an abrasive assembly, an operator provides a substrate that comprises a base layer and a plurality of protrusions extending outwardly from the base layer, the protrusions comprise a polymer having a Shore A hardness ranging from 5 to 90, and frictionally engaging the plurality of protrusions with a back surface of an abrasive article while using a working surface of the abrasive article to abrade the workpiece. Then, after disengaging the substrate from the abrasive article, the operator can rub the plurality of protrusions against the working surface of the abrasive article to dislodge any swarf and debris, and to at least partially collect the swarf and debris within the plurality of protrusions.

EXAMPLES

Objects and advantages of this disclosure are further illustrated by the following non-limiting examples. Particular materials and amounts thereof recited in these examples, however, as well as other conditions and details, should not be construed to unduly limit this disclosure.

The following abbreviations are used to describe the examples:

° C.: degrees Centigrade
cm: centimeter
g/eq.: grams per equivalent
g/m$^2$: grams per square meter
g/mol: grams per mole
mil: 10$^{-3}$ inch
mm: millimeter
μm: micrometer
UV: ultraviolet
W/in: Watts per inch
W/cm: Watts per centimeter Unless stated otherwise, all reagents were obtained or are available from chemical vendors such as Sigma-Aldrich Company, St. Louis, Mo., or may be synthesized by known methods. Unless otherwise reported, all ratios are by weight.

Abbreviations for materials and reagents used in the examples are as follows:

ACR: Trimethylolpropane triacrylate.
AMOX: Di-t-amyl oxalate.
CHDM: 1,4-cyclohexanedimethanol.
EP1: A bisphenol-A epichlorohydrin based epoxy resin having an epoxy equivalent weight of 525-550 g/eq. and an average epoxy functionality of 2, available as "EPON 1001F" from Momentive Specialty Chemicals, Inc., Columbus, Ohio.
EP2: A bisphenol-A epoxy resin having an epoxy equivalent weight of 185-192 g/eq. and an average epoxy functionality of 2, available as "EPON 828" from Momentive Specialty Chemicals, Inc., Columbus, Ohio.
EP3: (3',4'-epoxycyclohexylmethyl) 3',4'-epoxycyclohexanecarboxylate.
ESTANE: A thermoplastic polyether-based polyurethane resin, obtained under the trade designation "ESTANE 58887 NAT 021" from Lubrizol Advanced Materials, Cleveland, Ohio.
P800: A grade P800 aluminum oxide abrasive mineral, obtained under the trade designation "ALODUR BFRPL" from Treibacher Industrie AG.
PC1: Mixture of 4-thiophenylphenyl diphenyl sulfonium hexafluoroantimonate, and bis[4-(diphenylsulfonio)phenyl]sulfide bis(hexafluoroantimonate) in propylene carbonate, obtained under the trade designation CPI 6976 from Aceto Corporation, Port Washington, N.Y.
PC2: 2,2-dimethoxy-2-phenylacetophenone, obtained under trade designation IRGACURE 651 from BASF, Wyandotte, Mich.
PC3: $\eta^6$-[xylene(mixed-isomers)]$\eta^5$-cyclopentadienyliron (1+) hexafluoro antimonate(1−).
PC4: Ethyl (2,4,6-trimethylbenzoyl) phenylphosphinate, obtained under the trade designation IRGACURE TPO-L from BASF, Wyandotte, Mich.
PEP: A high molecular weight, hydroxyl-terminated, saturated, linear, semi-crystalline, copolyester, with a weight average molecular weight of 35,000 g/mol, available as "DYNAPOL S 1227" from Evonik Industries, Parsippany, N.J.
PET: A 1.97 mil (50 µm) thick polyester terephthalate film, obtained under the trade designation 602197 PET FILM from 3M Company.
PI: 2-hydroxy-2-methyl-1-phenyl-1-propanone.
PropCarb: Propylene carbonate, obtained under the trade designation JEFFSOL PC from Huntsman Corp, Woodlands, Tex.
UBI: A black ink, obtained under the trade designation HK11900174/K538, FLEXOMAX from Sun Chemical Corporation, Parsippany, N.J.
UGI: A gold ink, obtained under the trade designation ULTRABOND 871C Real Gold, WKJFSM171134/K53 from Sun Chemical Corporation, Parsippany, N.J.
URI: A red ink, obtained under the trade designation Flexomax 032 Red HF11400652 from Sun Chemical Corporation, Parsippany, N.J.
ZNST: A 39-41 percent by weight aqueous zinc stearate soap dispersion obtained under trade designation EC994C from eChem LTD, Leeds, UK.

Preparation of Make Resin

A make resin was prepared, according to the compositions listed in Table 1. AMOX, EP1, EP2, CHDM and PEP were directly metered to a twin screw extruder running at 300 rpm with temperature zones of 30, 105, 110, 100, 65, and 60° C. This mixed resin was then fed to a pin mixer running at 1750 rpm, and ACR, PC2, PC3, PC4, and PropCarb were directly metered into the pin mixer. The output from the pin mixer was fed to a heated coating die, where the flow rate from the pin mixer was controlled so as to achieve the make resin target on the abrasive backing as listed in Table 5.

TABLE 1

| Component | Make resin composition (% by wt.) |
|---|---|
| EP1 | 24.0 |
| EP2 | 32.0 |
| PEP | 28.0 |
| ACR | 10.0 |
| CHDM | 2.8 |
| PC2 | 0.5 |
| PC3 | 0.7 |
| PC4 | 0.3 |
| PropCarb | 1.1 |
| AMOX | 0.6 |

Preparation of Size Resin

Table 2 below lists the components and the amounts used to formulate the Size Resin. The size resin was prepared by combining and mixing EP2, EP3 and ACR, in a container. Prior to abrasive making, PC1 and PI were added to the premixed resin batch and stirred for 30 minutes at room temperature until homogeneous.

TABLE 2

| Ingredient type | Size Resin (% by wt.) |
|---|---|
| EP2 | 0 |
| EP3 | 44 |
| ACR | 19 |
| FLL | 33 |
| PC1 | 3 |
| PI | 1 |

Example 1

ESTANE resin was extrusion cast as a first thermoplastic polyurethane film, at an average thickness of 2 mils (50.8 µm), onto the 1.97 mil (50.04 µm) PET by means of single-screw extruder. Gold ink UGI was applied to the entire surface of the ESTANE film by means of a flexographic printer and drying was accomplished with heated forced air convection. A black text image comprising the mineral grade, 3M brand identification and a three character lot code were then printed over the gold ink using black ink UBI. The grade designation and 3M brand logo designation were printed in Arial font, 7/16 inch (11.1 mm) tall, the lot code was printed in Arial font, 1/4 inch (6.35 mm) tall. After the text image dried, a second 3 mil (76.2 µm) film of ESTANE was extrusion cast over the ink layer. The Make Resin was coated onto the second ESTANE film at a nominal coating weight of 16.5 g/m² and the film assembly passed under a Fusion UV Systems with one set of D-bulbs and one set of V-bulbs, both operating at 600 W/in (236 W/cm). Abrasive mineral P800 was then coated onto the make layer at a nominal coating weight of 25 g/m² and the web was then heated under infrared heaters, at a nominal web temperature setting of 100° C., for about 7 seconds. The Size Resin was then roll coated onto the make layer and abrasive particles at a nominal dry coating weight of 11 g/m² and passed under a Fusion UV Systems with one set of H-bulbs, and two sets of D-bulbs, all three operating at 600 W/in (236 W/cm). It was then processed through infrared ovens having a target exit web temperature of 125° C. ZNST at a nominal coating weight of 8.5 g/m² was then coated onto the size layer and processed through a drying oven with a target exit web temperature of 135° C. The resultant coated abrasive articles were then maintained at room temperature (i.e., 20-24° C.) and 40-60 percent relative humidity until tested.

The abrasive web was then flexed by wrapping it around a first ¼ inch (6.35 mm) diameter round metal bar with the backside of the abrasive in contact with the metal bar. The bar was oriented at a 45° angle relative to the web direction. The web was wrapped around the ¼ inch (6.35 mm) diameter bar such that approximately one half of the bar was in contact with the backside of the web. This resulted in a configuration in which the web movement prior to the bar was opposite the direction of web movement after the bar. Once the web moved past this first bar, the abrasive web was wrapped around a second ¼ inch (6.35 mm) diameter round metal bar with the backside of the abrasive in contact with the metal bar. This second bar was also at a 45° angle relative to the web direction, and a 90° orientation from the first bar. The wrap angle for the first and second bars was the same, and in both cases the backside of the abrasive was in contact with the bar.

The PET liner was removed to provide a flexible abrasive sheet.

Next, a sanding accessory was prepared by first providing a piece of blue Z100 foam (available from Rogers Foam Corporation, Somerville, Mass.) that was approximately 70 millimeters (2.756") by 135 millimeters (5.315") and 10 millimeters (0.394") thick. A piece of 3M Adhesive Transfer Tape 9453LE was used to attach a piece of 75 durometer styrene-butadiene rubber that was 1.533 millimeter (0.0625") thick (available from McMaster-Carr, Elmhurst, Ill.). Both sides of this construction were then laminated with 3M Gripping Material GM631 (available from 3M Company). A small amount of sanding dust was applied to the backside (the non-abrasive surface) of the flexible abrasive sheet. The surface of the accessory with the rubber under layer was then contacted with the backside of the abrasive. The abrasive surface of this film was then contacted with an automotive test panel available from ACT (Item #59597). It was noted that there was sufficient friction to move the abrasive by moving the sanding pad. The same procedure was repeated with the other side of the sanding accessory, and it was again noted that there was sufficient friction to move the abrasive by moving the sanding pad.

Example 2

A flexible abrasive sheet was prepared according to Example 1.

Next, a sanding accessory was prepared by first providing a piece of blue Z100 foam (available from Rogers Foam Corporation, Somerville, Mass.) that was approximately 70 millimeters (2.756") by 135 millimeters (5.315") and 10 millimeters (0.394") thick. Both sides of this foam were then laminated with 3M Gripping Material GM631. A small amount of sanding dust was applied to the backside (the non-abrasive surface) of the flexible abrasive sheet. A surface of the accessory was then contacted with the backside of the abrasive. The abrasive surface of this film was then contacted with an automotive test panel available from ACT (Item #59597). It was noted that there was sufficient friction to move the abrasive by moving the sanding pad.

Example 3

A flexible abrasive sheet was prepared according to Example 1.

A No. 20 sponge pad sold under the trade designation WETORDRY (Part No. 05526), obtained from 3M Company, was provided. Both sides of this pad were then laminated with 3M Gripping Material GM631. A small amount of sanding dust was applied to the backside (the non-abrasive surface) of the flexible abrasive sheet. A surface of the accessory was then contacted with the backside of the abrasive. The abrasive surface of this film was then contacted with an automotive test panel available from ACT (Item #59597). It was noted that there was sufficient friction to move the abrasive by moving the sanding pad.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive article comprising:
   a backing having opposed first and second major surfaces;
   an abrasive layer disposed on the first major surface; and
   a plurality of protrusions extending outwardly from the second major surface to form a gripping layer external to the abrasive article,
   wherein the protrusions comprise a polymer having a Shore A hardness ranging from 5 to 90,
   wherein the protrusions are free of undercuts, and
   wherein the protrusions have a height-to-width aspect ratio ranging from 0.5 to 10.

2. The abrasive article of claim 1, wherein the polymer has a Shore A hardness ranging from 20 to 70.

3. The abrasive article of claim 1, wherein the protrusions are arranged in a replicated two-dimensional pattern.

4. The abrasive article of claim 1, wherein the height-to-width aspect ratio ranges from 1.25 to 6.

5. The abrasive article of claim 1, wherein the protrusions have an overall height ranging from 10 micrometers to 800 micrometers.

6. The abrasive article of claim 5, wherein the protrusions have an overall height ranging from 50 micrometers to 600 micrometers.

7. The abrasive article of claim 6, wherein the protrusions have an overall height ranging from 100 micrometers to 400 micrometers.

8. The abrasive article of claim 1, wherein the protrusions have an areal number density ranging from 15 per square centimeter to 1,500 per square centimeter.

9. The abrasive article of claim 8, wherein the protrusions have an areal number density ranging from 100 per square centimeter to 1000 per square centimeter.

10. The abrasive article of claim 9, wherein the protrusions have an areal number density ranging from 250 per square centimeter to 600 per square centimeter.

11. The abrasive article of claim 1, wherein the polymer comprises an elastomer.

12. The abrasive article of claim 11, wherein the elastomer is selected from the group consisting of: polyurethanes, styrene-ethylene-butylene-styrene block copolymers, styrene-isoprene-styrene block copolymers, and blends thereof.

13. An abrasive assembly comprising:
    the abrasive article of claim 1; and
    a substrate having a working surface that engages the plurality of protrusions.

14. An abrasive assembly comprising:
an abrasive article having a working surface and a back surface; and
a substrate for engaging the back surface, wherein the substrate comprises a base layer and a plurality of protrusions extending outwardly from the base layer, the protrusions comprise a polymer having a Shore A hardness ranging from 5 to 90,
wherein the protrusions are free of undercuts,
wherein the protrusions have a height-to-width aspect ratio ranging from 0.5 to 10, and
wherein when the substrate is engaged with the back surface of the abrasive article, the abrasive assembly can be moved as a unit without need for an adhesive or mechanical fastener between the back surface and substrate.

15. The abrasive assembly of claim 14, wherein the substrate comprises a glove or component thereof.

16. The abrasive assembly of claim 14, wherein the substrate comprises a backup pad for use with a power tool.

17. An abrasive article comprising:
an abrasive backing having opposed first and second major surfaces;
an abrasive layer disposed on the first major surface; and
a gripping layer releasably attached to the second major surface, the gripping layer having a plurality of protrusions extending outwardly from the abrasive article,
wherein the protrusions comprise a polymer having a Shore A hardness ranging from 5 to 90,
wherein the protrusions have a height-to-width aspect ratio ranging from 0.5 to 10, and
wherein the protrusions are free of undercuts.

18. A method of using an abrasive assembly comprising the steps of:
providing a substrate that comprises a base layer and a plurality of protrusions extending outwardly from the base layer, the protrusions comprise a polymer having a Shore A hardness ranging from 5 to 90;
frictionally engaging the plurality of protrusions with a back surface of an abrasive article while using a working surface of the abrasive article to abrade the workpiece;
disengaging the substrate from the abrasive article; and
rubbing the plurality of protrusions against the working surface of the abrasive article to dislodge swarf or debris,
wherein the protrusion are free of undercuts,
wherein the protrusions have a height-to-width aspect ratio ranging from 0.5 to 10, and
wherein when the substrate is engaged with the back surface of the abrasive article, the abrasive assembly can be moved as a unit without need for an adhesive or mechanical fastener between the back surface and substrate.

* * * * *